United States Patent
Kelly et al.

(10) Patent No.: US 12,430,833 B2
(45) Date of Patent: Sep. 30, 2025

(54) REALTIME AI SIGN LANGUAGE RECOGNITION WITH AVATAR

(71) Applicant: Sign-Speak Inc., Rochester, NY (US)

(72) Inventors: Nikolas Anthony Kelly, Victor, NY (US); Nicholas Wilkins, Victor, NY (US); Yamillet Payano, Victor, NY (US)

(73) Assignee: SIGN-SPEAK INC., Rochester, NY (US)

( * ) Notice: Subject to any disclaimer, the term of this patent is extended or adjusted under 35 U.S.C. 154(b) by 23 days.

(21) Appl. No.: 18/216,917

(22) Filed: Jun. 30, 2023

(65) Prior Publication Data

US 2023/0343011 A1   Oct. 26, 2023

Related U.S. Application Data

(63) Continuation-in-part of application No. 17/302,699, filed on May 11, 2021.
(Continued)

(51) Int. Cl.
*G06T 13/20* (2011.01)
*G06F 40/284* (2020.01)
(Continued)

(52) U.S. Cl.
CPC .......... *G06T 13/205* (2013.01); *G06F 40/284* (2020.01); *G06F 40/58* (2020.01); *G06T 13/40* (2013.01)

(58) Field of Classification Search
CPC ..... G06T 13/205; G06T 13/40; G06F 40/284; G06F 40/58
See application file for complete search history.

(56) References Cited

U.S. PATENT DOCUMENTS 5,473,705 A    12/1995  Abe
5,659,764 A *   8/1997  Sakiyama ............ G09B 21/009
                                                    345/473
(Continued)

OTHER PUBLICATIONS

Habibie, I., et al., "Learning Speech-driven 3D Conversational Gestures from Video," arXiv, Computer Vision and Pattern Recognition, (Feb. 2021), 15 Pages.
(Continued)

*Primary Examiner* — Eddy Saint-Vil
(74) *Attorney, Agent, or Firm* — Sterne, Kessler, Goldstein &Fox

(57) ABSTRACT

Disclosed herein are method and system aspects for translating between a sign language and a target language and presenting such translations. For example, a method receives input language data and translates the input language data into sign language grammar. The method retrieves phonetic representations that correspond to the sign language grammar from a sign language database and generates coordinates from the phonetic representations using a generative network. The phonetic representations are digital representations of individual signs created through manual input of body configuration information corresponding to the individual signs. Further, the method renders an avatar that moves between the coordinates. In another example, a bidirectional communication system allows for realtime communication between a signing entity and a non-signing entity.

25 Claims, 10 Drawing Sheets

Related U.S. Application Data

(60) Provisional application No. 63/101,716, filed on May 11, 2020.

(51) Int. Cl.
*G06F 40/58* (2020.01)
*G06T 13/40* (2011.01)

(56) References Cited

U.S. PATENT DOCUMENTS

| | | |
|---|---|---|
| 7,746,986 B2 | 6/2010 | Bucchieri |
| 8,428,643 B2 | 4/2013 | Lin |
| 8,890,813 B2 | 11/2014 | Minnen |
| 9,069,385 B1* | 6/2015 | Lynch ..................... G06F 3/014 |
| 9,098,493 B2 | 8/2015 | Tardif |
| 9,734,730 B2 | 8/2017 | Divakaran et al. |
| 10,192,105 B1 | 1/2019 | Mahmoud |
| 10,261,596 B2 | 4/2019 | Burr |
| 10,262,198 B2 | 4/2019 | Mahmoud |
| 10,268,879 B2 | 4/2019 | Mahmoud |
| 10,289,903 B1 | 5/2019 | Chandler |
| 10,304,208 B1 | 5/2019 | Chandler |
| 10,521,264 B2 | 12/2019 | Chandler |
| 10,762,340 B2 | 9/2020 | Kaur |
| 10,885,318 B2 | 1/2021 | Maxwell |
| 10,977,452 B2 | 4/2021 | Wang et al. |
| 10,991,380 B2 | 4/2021 | Santos |
| 11,163,373 B2 | 11/2021 | Liu et al. |
| 11,323,663 B1 | 5/2022 | Kasaba |
| 11,741,755 B2 | 8/2023 | Ko et al. |
| 2006/0174315 A1 | 8/2006 | Kim et al. |
| 2016/0307469 A1 | 10/2016 | Zhou |
| 2017/0228366 A1* | 8/2017 | Bui ..................... G06F 40/247 |
| 2017/0351910 A1 | 12/2017 | Elwazer |
| 2018/0301061 A1* | 10/2018 | Paudyal .................. G06F 40/58 |
| 2019/0050637 A1 | 2/2019 | Mahmoud et al. |
| 2019/0073525 A1* | 3/2019 | Kim ..................... G06V 40/28 |
| 2019/0171716 A1 | 6/2019 | Weber |
| 2020/0034609 A1* | 1/2020 | Chandler ............. G06V 10/764 |
| 2021/0043110 A1* | 2/2021 | Jung ..................... G10L 15/24 |
| 2022/0327120 A1* | 10/2022 | Yanez Lucero ......... G06F 16/35 |
| 2022/0327961 A1 | 10/2022 | Kelly |

OTHER PUBLICATIONS

International Search Report and Written Opinion for Application No. PCT/US2024/036228, mailed on Dec. 2, 2024, 5 pages.

Kotha, H., et al., Audio to Sign language Using NLTK, International Journal of Emerging Technologies and Innovative Research 10(6):e404-e408, (Jun. 2023). (retrieved on Sep. 4, 2024). URL: [https://www.jetir.org/view?paper=JETIR2306484].

Sharma, P., et al., "Translating Speech to Indian Sign Language Using Natural Language Processing," Future Internet 14(9):253, (Aug. 2022), 17 Pages.

* cited by examiner

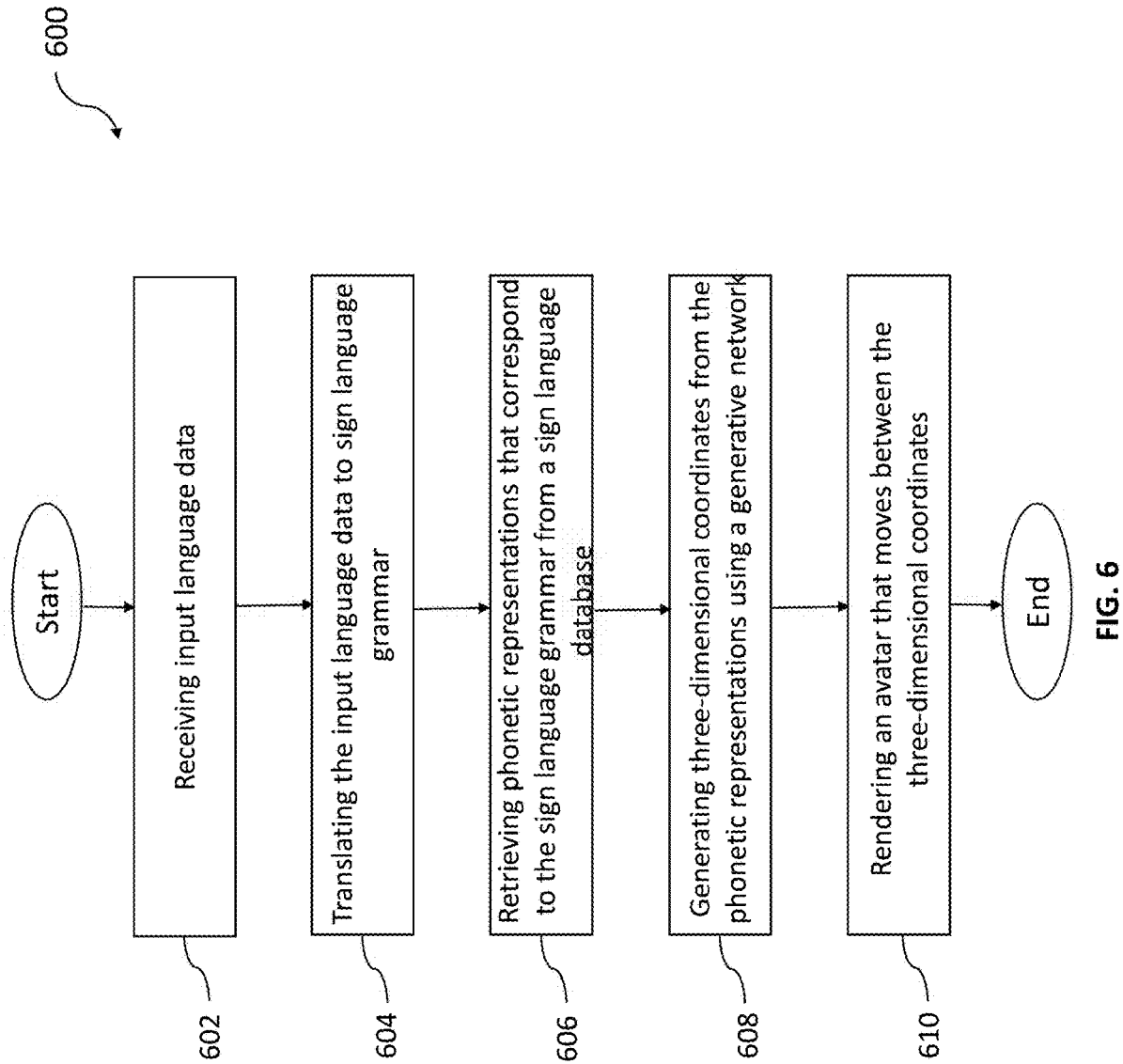

REALTIME AI SIGN LANGUAGE RECOGNITION WITH AVATAR

CROSS-REFERENCE TO RELATED APPLICATIONS

This application is a Continuation-In-Part of U.S. Non-Provisional patent application Ser. No. 17/302,699, filed on May 11, 2021, now pending, which claims benefit to U.S. Provisional Patent Application No. 63/101,716, filed on May 11, 2020, now expired, all of which are hereby incorporated by reference herein.

FIELD

Aspects of the present disclosure relate to components, systems, and methods for translation between a spoken or written language and a sign language, and the presentation of such translations.

BACKGROUND

Deaf individuals typically have little or no functional hearing, and hard-of-hearing (HoH) individuals typically have hearing loss that can be partially mitigated by an auditory device. Deaf and HoH individuals can communicate using a sign language. A sign language is a visual communication system. There may be over 200 different sign languages, such as American Sign Language (ASL), British Sign Language (BSL), or German Sign Language (DGS). For both Deaf and HoH individuals, systems for translating between a sign language and a spoken or written language can improve daily interactions.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

FIG. 6 is a flowchart of a method for presenting a sign language translation of source text in an input language, according to some aspects of the present disclosure.

In the drawings, like reference numbers generally indicate identical or similar elements. Additionally, generally the left-most digit(s) of a reference number identifies the drawing in which the reference number first appears.

Figure 1:
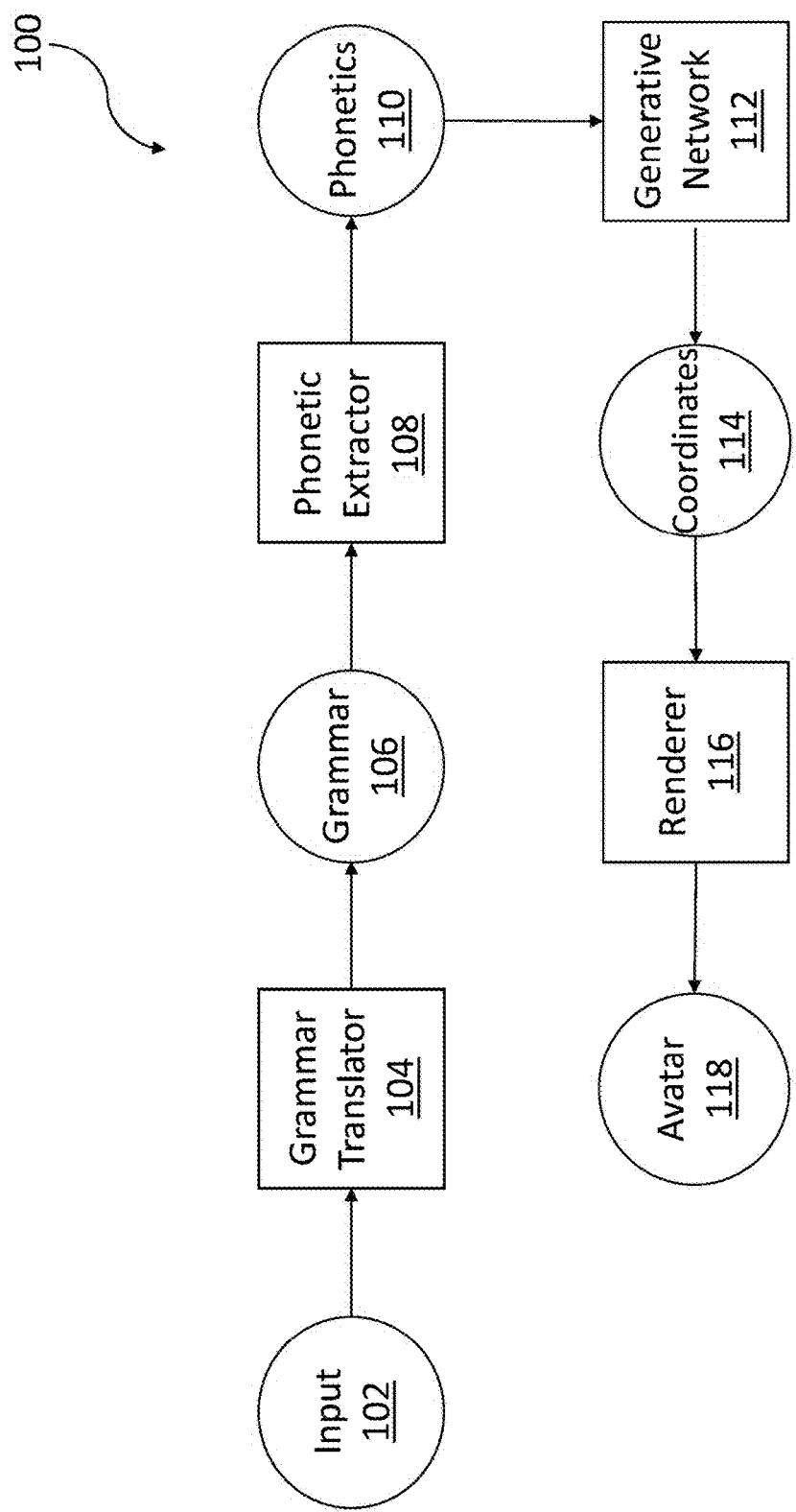
FIG. 1 is a block diagram of a system for generating and presenting a sign language translation of source text in an input language, according to some aspects of the present disclosure.

Aspects of the present disclosure will be described with reference to the accompanying drawings.

DETAILED DESCRIPTION

Provided herein are apparatus, device, system, and/or method aspects, and/or combinations and sub-combinations thereof, for translating between a sign language and a spoken or written language, and the presentation of such translations.

For many Deaf and hard-of-hearing (HoH) individuals, American Sign Language (ASL) is their first language. ASL is a language with significantly different grammatical structures from English. For example, ASL has a distinct grammatical structure whose morphological inflection is not easily captured by annotation mechanisms. Signs for "Help You," "Help Me," and "Help Them" are all inflected differently. In another example, ASL has a construct called "classifiers" that have no equivalent structure in spoken language. Classifiers are visual depictions of certain words in three-dimensional space. In yet another example, ASL has no written form, making lexicalization difficult. These sign language characteristics pose challenges when translating from English to ASL, including how the translations are presented to a user. As such, when translating between ASL and a spoken or written language, it is useful to present ASL in a video format. This is also true with translations involving other sign languages, such as British Sign Language, which are within the scope of the present disclosure.

Systems can use a word-level or a motion-capture method for presenting sign language translations to a user. A word-level method presents a sign language translation through an avatar on a per-word basis. However, because the signs presented by the avatar are retrieved on a per-word basis without further processing, the translation lacks higher-level linguistic features (e.g., proper inflection, classifiers) and a natural (e.g., smooth transitions) presentation. A motion-capture method presents a sign language translation of predetermined text through an avatar created using motion capture suits. While this method produces natural (e.g., smooth) signing, only those phrases that have been recorded using the motion capture suits can be presented. As such, this method is not generalizable to arbitrary strings of source text.

Problems also arise when attempting to translate from a sign language to a chosen spoken or written language. Existing systems may attempt to capture a user while they sign into a camera. From this captured imagery, the existing systems may attempt to translate the sign language input into an output language. However, these systems often require specialized hardware, require system personalization on a per-user basis, are unable to provide real-time processing of sign language video, and/or are unable to detect the distinct grammatical structures of the sign language.

There are at least five problems associated with the above systems for translating between a sign language and a spoken or written language, and presenting such translations. First, systems built on a per-word basis are unable to present translations that include higher-level linguistic features unique to sign language grammar, such as those described previously for ASL. Additionally, these systems do not have a natural (e.g., smooth, lifelike, etc.) appearance because they do not smoothly transition between individual signs. Second, even systems that have a natural appearance (such as those built on a motion-capture method) are unable to provide translations for arbitrary (e.g., previously unrecorded) strings of source text. Third, systems capable of translating a spoken or written language into a chosen sign language are often incapable of detecting sign language input and translating them into a chosen spoken or written language. Fourth, those systems that are able to detect sign language input and to translate them into a chosen spoken or written language often require specialized hardware or have sub-par accuracy. Lastly, even if systems may be capable of both translating a spoken or written language into a chosen sign language and capable of detecting sign language input and translating it into a chosen spoken or written language, the systems are incapable of providing realtime bidirectional communication between a signing entity and a non-signing entity.

Aspects herein address these problems using an innovative translation and presentation method that presents an avatar that naturally (e.g., smoothly) signs a translation of a spoken or written language. The innovative translation and presentation method further provides a bidirectional communication system allowing for realtime communication between a signing entity and a non-signing entity. In some aspects of the present disclosure, the translation and presentation method uses phonetic representations and a generative network to produce natural sign translations for arbitrary strings of source text of the spoken or written language. For example, in one embodiment, after the system has received and converted data of the spoken or written language into sign language grammar, phonetic representations corresponding to the sign language grammar (created through input of body configuration information) are retrieved from a database. The generative network is then applied to these phonetic representations to render an avatar that includes higher-level linguistic features and naturally signs a translation of the spoken or written language. In this example, the generative network has been trained to generate coordinates ideal for natural (e.g., smooth) transitions between individual signs in a translation from a spoken or written language. In other aspects of the present disclosure, the translation and presentation method combines the above described examples with the ability to detect and convert a signing user's sign language input into a chosen spoken or written language in realtime without the need of specialized equipment. Therefore, the innovative translation and presentation method of presenting an avatar that naturally signs a translation of a spoken or written language and providing bidirectional communication solves the above technological problems by providing higher-level linguistic features, smoothly transitioning between individual signs to provide a natural visual translation, working with arbitrary strings of source text, and translating between spoken or written language into sign language in realtime.

Throughout this description, it is to be understood that a spoken or written language can be referred to as input or output language, depending on the direction of translation. For example, when translating from a sign language input to a chosen spoken or written language, the chosen spoken or written language may be referred to as an output language. In another example, when translating from a spoken or written language to a chosen sign language, the spoken or written language may be referred to as an input language. Regardless of the direction of translation, a target language is to be understood as the spoken or written language (e.g., English), unless otherwise described.

FIG. 1 is a block diagram of a system 100 for generating and presenting a sign language translation of source text in an input language, according to some aspects of the present disclosure. System 100 can include grammar translator 104, phonetic extractor 108, generative network 112, and renderer 116. Grammar translator 104, phonetic extractor 108, generative network 112, and renderer 116 can be implemented on a server computer, virtual machine, container, cloud-computing platform, a desktop computer, laptop, tablet, smartphone, or other device as would be appreciated by a person of ordinary skill in the art. System 100 can be used to intake, process, or output one or more data items (e.g., illustrated as circles in FIG. 1), including input 102, grammar 106, phonetics 110, coordinates 114, and avatar 118. FIG. 1 will be described with reference to FIGS. 2-5.

In some aspects, grammar translator 104 receives input 102 and outputs grammar 106. Grammar translator 104 can process input 102 according to one or more algorithms that includes one or more computational operations to produce grammar 106. Input 102 can be data (e.g., source text) of an input language, such as English, German, Spanish, or another written or spoken language. For example, input 102 can be an English sentence that reads, "Hello. I'm good, how're you?"

The one or more algorithms of grammar translator 104 can include the following computational operations: (1) tokenizing input 102 into individual components (e.g., word and punctuation); (2) removing punctuation, determiners, and certain vocabulary (e.g., existential there's, infinitival to's, helping verbs, etc.) from the individual components to form a resulting string; (3) reducing the resulting string according to a lemmatization scheme to form a lemmatized string; and/or (4) performing a tree transduction on the lemmatized string to produce sign language grammar (e.g., grammar 106). One or more rules specific to a type of sign language can be applied to computational operations (2)-(4) to output grammar 106 consistent with the grammatical conventions of the sign language. For example, a rule set for ASL can be applied when grammar translator 104 applies the one or more algorithms to input 102 so that grammar translator 104 can output grammar 106 in a format compatible for a translation to ASL grammar.

In an example first operation, grammar translator 104 can tokenize the English sentences of "Hello. I'm good, how're you?" into individual components: (a) "Hello"; (b) "."; (c) "I"; (d) "'m"; (e) "good"; (f) ","; (g) "how"; (h) "'re"; (i) "you"; (j) "?". In an example second operation, grammar translator 104 can remove certain of the individual components to form a resulting string including (a) "Hello"; (c) "I"; (e) "good"; (g) "how"; (i) "you." Here, the following components are removed in the second operation: (b) "."; (d) "'m"; (f) ","; (h) "'re"; and (j) "?". In an example third operation, grammar translator 104 can reduce the resulting string according to a lemmatization scheme. In some aspects, a lemmatization scheme groups words based on inflected or variant forms of the same word. In an example, a lemma-lookup dictionary or a lemmatizer can be used to map the resulting string into a resulting lemmatized string. For instance, the resulting lemmatized string of operation three can be (a) "Hello"; (c') "me"; (e) "good"; (g) "how"; (i) "you". As described, component (c) was lemmatized to component (c') to reduce a variant form "I" into base form "me." In an example fourth operation, grammar translator 104 can perform a tree transduction on the lemmatized scheme to produce grammar 106 in a format compatible for a translation to ASL grammar. A tree transduction can reorder the components of the lemmatized string. The tree transduction can be conducted by one or more tree transducers. The tree transducers can be based on synchronous grammar models configured to generate related strings using parsing algorithms for synchronous context free grammar (e.g., a synchronous Cocker-Younger-Kasami (CYK) algorithm). The grammar models can be probabilistic or non-probabilistic. Specifically, weighted or unweighted synchronous production rules can be provided. Based on these rules, the lemmatized string can be parsed using the parsing algorithms. For example, the lemmatized string of operation three can be reordered to (a) "Hello"; (c') "me"; (e) "good"; (i) "you"; (g) "how". This reordered string is the output of grammar 106 in a format compatible for a translation to ASL grammar. In this sense, grammar 106 can be a particularly ordered list of certain input words used in system 100 to produce the translation presented by avatar 118, based on one or more rules specific to a type of sign language.

Grammar translator 104 can interface with phonetic extractor 108 through one or more communications channels, which can be wired, wireless, or a combination thereof. These communications channels can include any combination of Local Area Networks, Wide Area Networks, the Internet, and any other suitable communication means. Grammar translator 104 and phonetic extractor 108 can also be run in the same program.

In some aspects, phonetic extractor 108 receives grammar 106 and outputs phonetics 110, Phonetic extractor 108 can include a sign language database. The sign language database can be a database management system (DBMS) or encoded in some machine learning model that stores phonetics 110. In some aspects, the sign language database can be located at a single location or multiple locations and can be implemented on a server computer, virtual machine, container, cloud-computing platform, or other device as would be appreciated by a person of ordinary skill in the art. Further, the sign language database can be implemented on a desktop computer, laptop, tablet, smartphone, or other device as would be appreciated by a person of ordinary skill in the art. Phonetic extractor 108 can retrieve phonetics 110 for each of the individual words of grammar 106 from the sign language database.

Figure 2:
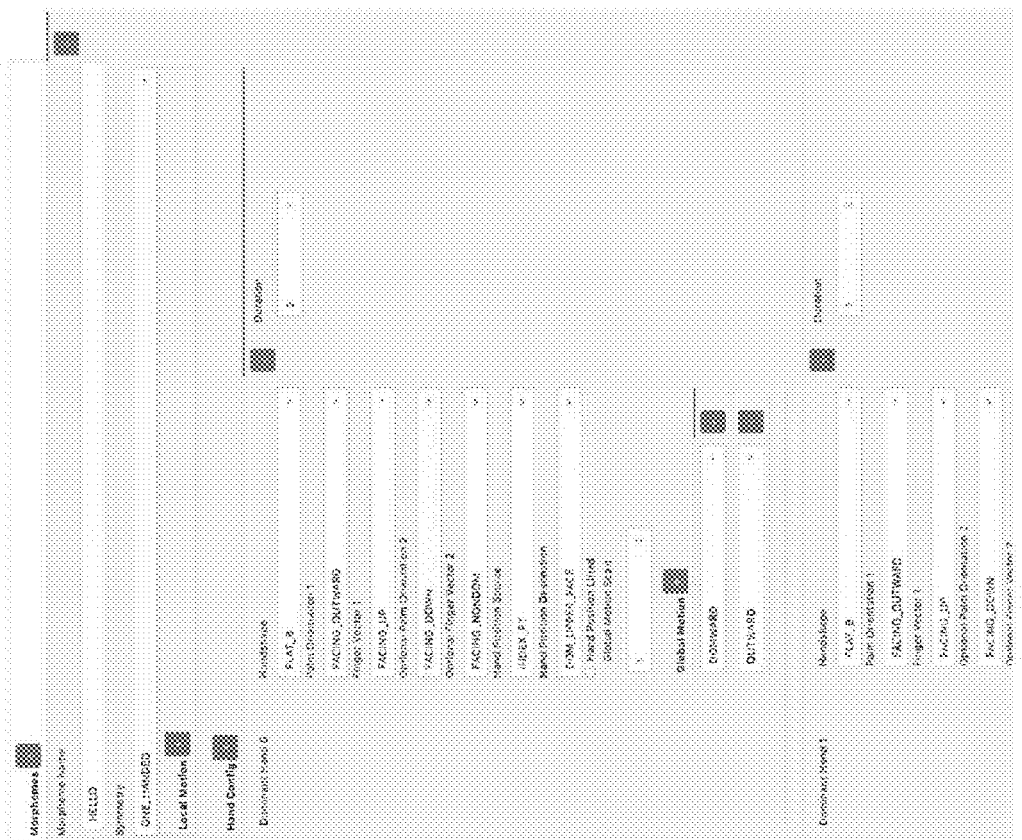
FIG. 2 is an illustration of a user interface used when translating source text in an input language to sign language grammar, according to some aspects of the present disclosure.

Phonetics 110 can be phonetic representations of individual signs created through manual input of body configuration information corresponding to the individual signs. For example, annotators can input configuration information about each sign's phonetic production to produce phonetics 110 for each individual sign. Phonetics 110 can be specific to a specific type of sign language. Referring to FIG. 2, an illustration of a user interface used when inputting body configuration information corresponding to individual signs according to some aspects of the present disclosure, for each of the individual words of grammar 106, a phonetic representation is created using body configuration information corresponding to a sign language representation of that grammar 106.

Body configuration information can be at least partially derived from the Stokoe Model or the Liddell and Johnson Movement-Hold model of sign structure or any other sign structure model as would be appreciated by a person of ordinary skill in the art. For instance, under the Stokoe Model, "Hello" (}BD>fD) could be represented with a coded combination indicating a side-face location (}), a flat hand handshake (B), a movement toward the dominant side (D>), and an orientation facing away from the signer (fD). Under the Movement-Hold model, a timing unit pattern could be monitored, along with contour, contact, local movement, strong hand handshape, strong hand location, strong hand palm orientation, weak hand handshape, weak hand location, weak hand palm orientation, and non-manual features. Body configuration information of the present disclosure expands upon the Stokoe model using elements from the Movement-Hold model. For example, the Stokoe model can be limited in its ability to express simultaneous phonetic information. The present disclosure can address this by monitoring potential positions, similar to the Movement-Hold model, as well as positions separated into position source and position destination. Movement monitoring has similarly been divided into two classes of global and local movement, and monitoring of palm orientation includes information on finger vectors. Additionally, body configurations are allowed to have a starting and ending configuration to account for changing signs, and hand symmetry is monitored.

Accordingly, body configuration information of the present disclosure can include various criteria, such as hand symmetry, handshape, hand orientation, finger vectors, hand position source, hand position destination, global motion of the hand, local motion of the hand, mouth morpheme and other non-manual markers, and duration of the movement. Hand symmetry describes whether a sign is one-handed or two-handed, and if it is a two-handed sign, whether the sign is symmetrical, asymmetrical, or alternating. Symmetrical, asymmetrical, and alternating signs can be defined by whether the dominant hand and the non-dominant hand use the same handshape and movement. Handshape describes the shape of each hand. Hand orientation describes which direction each hand's palm is facing during the production of a sign. Hand position source describes which part of the hand should be at the hand position destination. Hand position destination describes the location of each hand during production of a sign. Global motion of the hand describes the general movement during the production of a sign. Local motion of the hand describes localized movement of the wrist and fingers during production of a sign. Mouth morphemes and other non-manual markers, such as facial expressions, describe non-hand related aspects of body configuration (such as lips pursing). For example, the ASL body configuration information for an individual component of grammar 106, (a) "Hello", can be represented by a flat handshape, an outward facing palm orientation, an upward facing finger vector, a hand position source of the index finger, a hand position destination of the upper face, a downward and outward global motion, and a duration of one second. In this example, this body configuration information can be stored in sign language database of phonetic extractor 108 as phonetics 110 (e.g., phonetic representation) corresponding to the ASL sign for the word (a) "Hello" of grammar 106.

Referring back to FIG. 1, if grammar 106 includes (a) "Hello" and the desired translation presented from avatar 118 is to be in ASL, then phonetic extractor 108 retrieves the ASL phonetic representation of (a) "Hello" from the sign language database as phonetics 110. Phonetic extractor 108 retrieves an ASL phonetic representation for each of the individual words of grammar 106 to output phonetics 110. For example, phonetics 110 includes the ASL phonetic representations of (a) "Hello"; (c') "me"; (e) "good"; (i) "you"; (g) "how". And phonetics 110 is retrieved in the same order as the individual words are received. Phonetics 110 can then be processed by generative network 112.

Phonetic extractor 108 can interface with generative network 112 through one or more communications channels, which can be wired, wireless, or a combination thereof. These communications channels can include any combination of Local Area Networks, Wide Area Networks, the Internet, and any other suitable communication means.

In some aspects, generative network 112 can be a generative artificial intelligence or machine learning network. For example, generative network 112 can be a conditional generative adversarial network (CGAN). In another example, generative network 112 can be a manually-trained network. Generative network 112 can generate coordinates 114 from phonetics 110. Coordinates 114 can be two-dimensional coordinates (e.g. [x, y]), three-dimensional coordinates (e.g., [x, y, z]), or other encoding as would be appreciated by a person of ordinary skill in the art. Coordinates 114 identified as ideal for natural (e.g., smooth) transitions between individual phonetic representations of phonetics 110 in a translation of input 102 can be referred to as "key-points." In some aspects, generative network 112 can be configured to generate a natural (e.g., smooth, lifelike, etc.) sign language translation of input 102.

Figure 3:
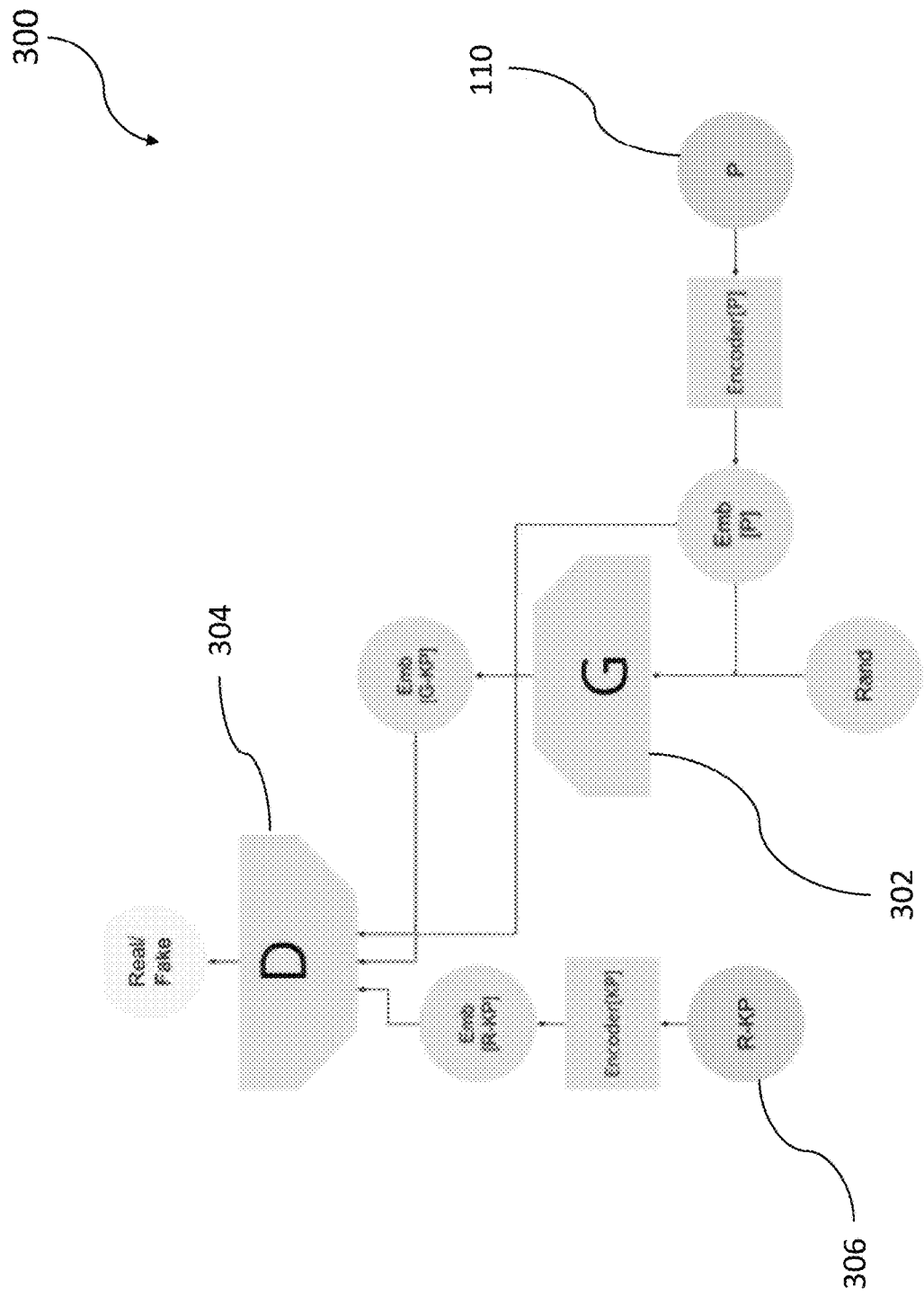
FIG. 3 is a block diagram of a training process for a generative network generating coordinates from phonetic representations, according to some aspects of the present disclosure.

Generative network 112 can be a CGAN trained according to FIG. 3. FIG. 3 is a block diagram of a training process 300 for generative network 112 used before generating coordinates 114 from phonetics 110, according to some aspects of the present disclosure. Generative network 112 in training process 300 can include generator 302 and discriminator 304. Generative network 112 can also include embedding space representations, encoders, decoders (e.g., seq2seq autoencoders), or intermediary data. The encoders can translate an input into the embedding space representations. The embedding space representations can be semantic representations of an input within a computer-readable format (e.g., using a word2vec algorithm). The decoders can translate from the semantic representations to the target output. Generative network 112 can intake or process one or more data items (illustrated as circles in FIG. 3), including phonetics 110 and real key-points 306 during training process 300. Real key-points 306 (e.g., measured coordinates) can be detected through pose recognition. Pose recognition intakes an input image and identifies real key-points 306 either in the image space or in global space (e.g., real or world-coordinate).

During training process 300, generator 302 is configured to generate artificial key-points (e.g., coordinates), and discriminator 304 is configured to use real key-points 306 to determine whether artificial key-points are real or fake. As training process 300 continues and discriminator 304 identifies certain artificial key-points as fake, generator 302 generates the artificial key-points in different ways to fool discriminator 304 until the desired amount of training has concluded. Generator 302 attempts to fool discriminator 304 based on the authenticity of artificial key-points, while discriminator 304 attempts to distinguish between artificial key-points and real key-points to improve the quality of artificial key-point generation. Once generative network 112 is trained, training process 300 can transition into the inference process 400, illustrated in FIG. 4.

Figure 4:
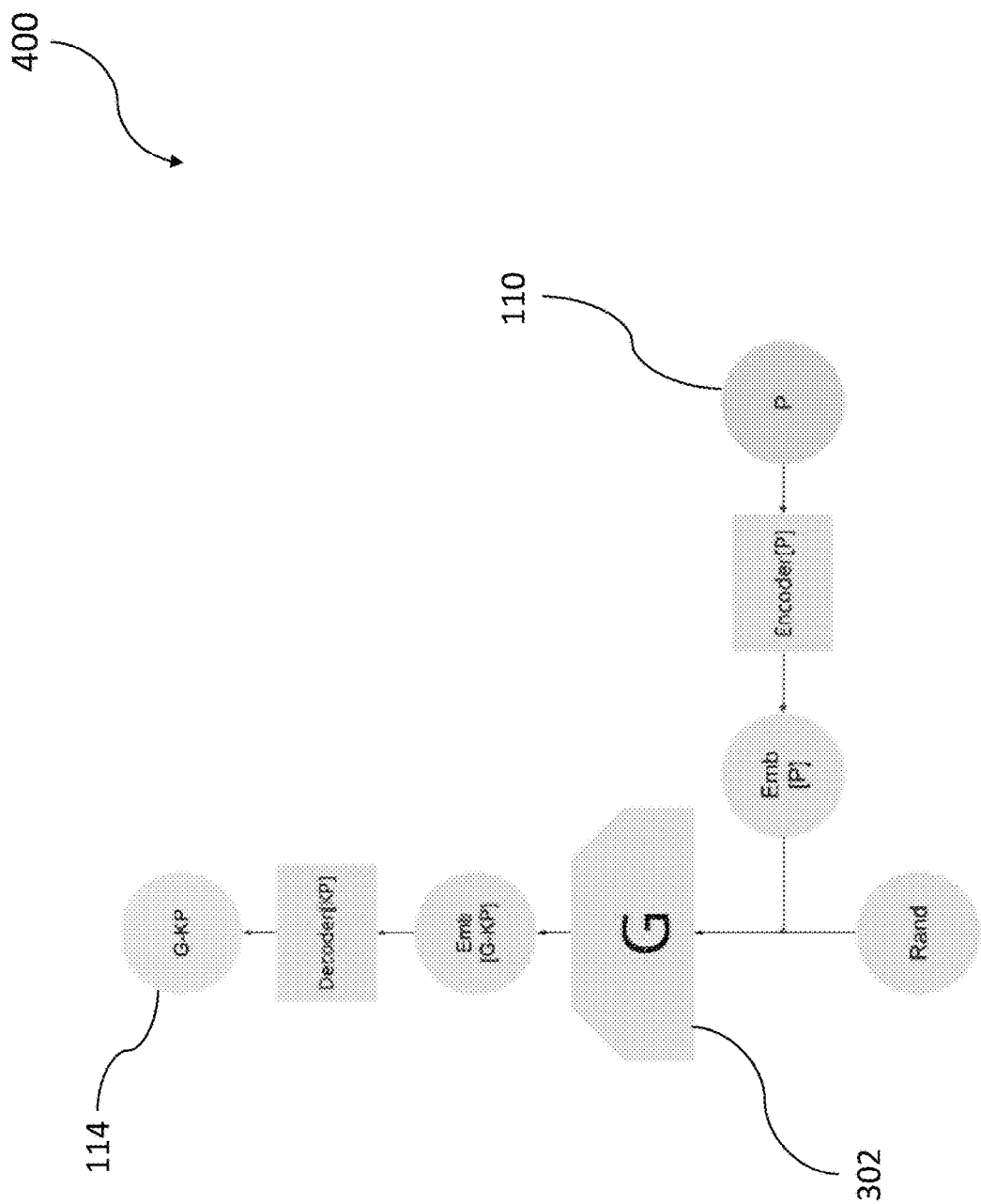
FIG. 4 is a block diagram of an inference process for a generative network used when generating coordinates from phonetic representations, according to some aspects of the present disclosure.

FIG. 4 is a block diagram of inference process 400 for generative network 112 used when generating coordinates 114 from phonetics 110, according to some aspects of the present disclosure. Generative network 112 in inference process 400 can include generator 302. Generative network 112 can also include embedding space representations, encoders, decoders (e.g., seq2seq autoencoders), or intermediary data. The encoders can translate an input into the embedding space representations. The embedding space representations can be semantic representations of an input within a computer-readable format (e.g., using a word2vec algorithm). The decoders can translate from the semantic representations to the target output. In inference process 400, generator 302 can have been trained using training process 300. In inference process 400, generator 302 can receive phonetics 110 to generate coordinates 114 for each individual phonetic representation of phonetics 110. For example, coordinates 114 can include sets of $(x_1, y_1, z_1)$ coordinates corresponding to the phonetic representation of (a) "Hello" of phonetics 110. And a second set of coordinates 114 can include $(x_2, y_2, z_2)$ coordinates corresponding to the phonetic representation of (c') "me" of phonetics 110.

Referring back to FIG. 1, coordinates 114 generated by generative network 112 can be used by renderer 116 to generate a natural (e.g., smooth) presentation of a sign language translation of input 102. Generative network 112 can interface with renderer 116 through one or more communications channels, which can be wired, wireless, or a combination thereof. These communications channels can include any combination of Local Area Networks, Wide Area Networks, the Internet, and any other suitable communication means.

In some aspects, renderer 116 can be an inverse kinematic rendering system that puppeteers avatar 118. In this aspect, avatar 118 is also recorded, saved, and animated by renderer 116. Renderer 116 can render avatar 118 based on the phonetic representations of phonetics 110 and then can animate between phonetics 110 using coordinates 114 (e.g., key points) to produce a natural (e.g., smooth, lifelike) animation of the sign language translation. Alternatively, renderer 116 can be a CGAN trained to produce lifelike (e.g., deepfake) videos when provided coordinates. This General Adversarial Network is similar to generative network 112, but is configured to be conditioned on coordinates (rather than phonetics) and produce videos (rather than coordinates).

Figure 5:
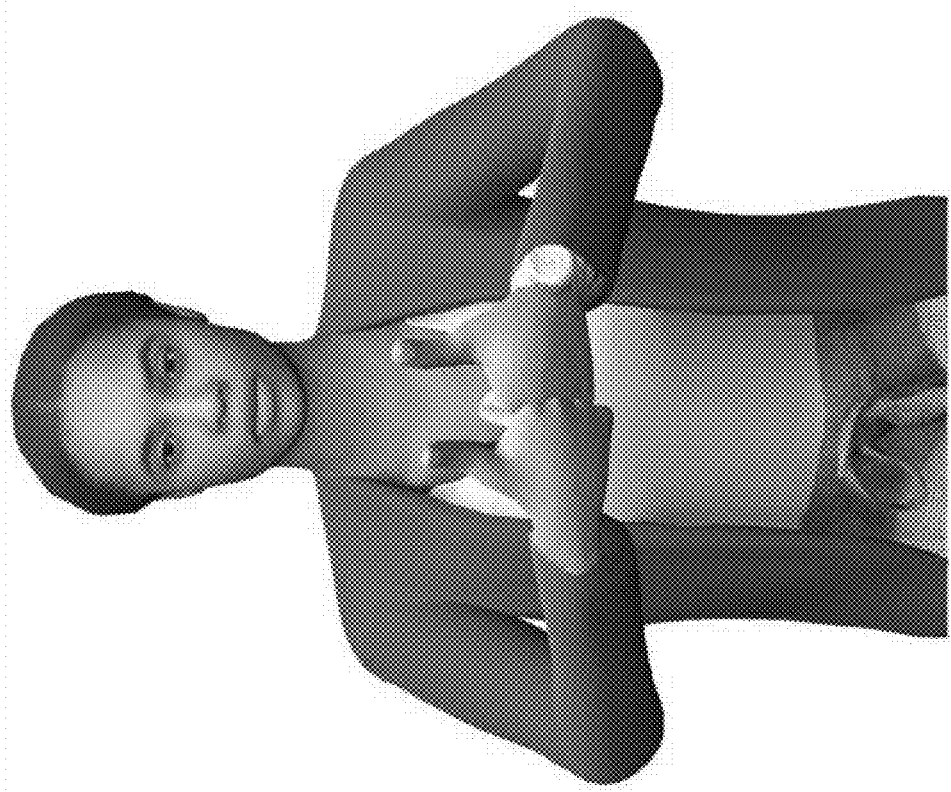
FIG. 5 is an illustration of an avatar presenting a sign language translation of source text in an input language, according to some aspects of the present disclosure.

FIG. 5 is an example illustration of avatar 118 presenting a sign language translation of input 102, according to some aspects of the present disclosure. Avatar 118 is a computer representation of a human-like character in a computer-generated three-dimensional environment. Avatar 118 can be a computer representation capable of presenting a sign language, including individual signs and movement between individual signs. Avatar 118 can be a portion of a human-like character (e.g., from the waist to the head), including hands, arms, and a face.

FIG. 6 is a flowchart for a method 600 for presenting a sign language translation of source text in an input language, according to an aspect of the invention. It is to be appreciated that not all operations can be needed to perform the disclosure provided herein. Further, some of the operations can be performed simultaneously, or in a different order than shown in FIG. 6, as will be understood by a person of ordinary skill in the art. Method 600 can be implemented by system 100 and operations performed by computing device 900 of FIG. 9. However, method 600 is not limited to that example aspect.

In operation 602, input language data is received. The input language data can be received by grammar translator 104. In an example, the input language data can be English sentences that read, "Hello. I'm good, how're you?"

In operation 604, the input language data from operation 602 is translated to sign language grammar. The input language data can be translated to sign language grammar by grammar translator 104. Operation 604 can include sub-operations, including the input language data from operation 602 being tokenized into individual words; certain punctuation, determiners, or vocabulary being removed from the individual words to form a resulting string; the resulting string being reduced according to a lemmatization scheme to form a lemmatized string; and a tree transduction being performed on the lemmatized string to produce sign language grammar.

In an example first operation, the English sentences of "Hello. I'm good, how're you?" can be tokenized into individual components: (a) "Hello"; (b) "."; (c) "I"; (d) "'m"; (e) "good"; (f) ","; (g) "how"; (h) "'re"; (i) "you"; (j) "?". In an example second operation, certain of the individual components can be removed to form a resulting string including (a) "Hello"; (c) "I"; (e) "good"; (g) "how"; (i) "you." In an example third operation, resulting string can be reduced according to a lemmatization scheme. The lemmatization scheme groups words based on inflected or variant forms of the same word. For example, the resulting lemmatized string of operation three can be (a) "Hello"; (c') "[me]"; (e) "good"; (g) "how"; (i) "you". As described, (c) was lemmatized to (c') to reduce a variant form, "I", into base form "me." In an example fourth operation, a tree transduction can be performed on the lemmatized scheme to produce sign language grammar in a format compatible for a translation to a type of sign language grammar A tree transduction can reorder the components of the lemmatized string. For example, the lemmatized string of operation three can be reordered to (a) "Hello"; (c') "[me]"; (e) "good"; (i) "you"; (g) "how".

In operation 606, phonetic representations that correspond to the sign language grammar from operation 604 are retrieved from a sign language database. The phonetic representations can be retrieved by phonetic extractor 108. Annotators can input body configuration information about each sign's phonetic production to produce phonetic representations for each individual sign before they are retrieved from a sign language database.

Body configuration information can be at least partially derived from the Stokoe Model or the Liddell and Johnson Movement-Hold model of sign structure or any other sign structure model as would be appreciated by a person of ordinary skill in the art. Body configuration information can include various criteria, such as handshape, palm orientation, finger vectors, hand position source, hand position destination, global motion of the hand, and duration of the movement. In an example, the body configuration information for an individual component of sign language grammar, (a) "Hello", can be represented by a flat handshape, an outward facing palm orientation, an upward facing finger vector, a hand position source of the index finger, a hand position destination of the upper face, a downward and outward global motion, and a duration of two seconds. The phonetic representations for each of the individual words of sign language grammar are retrieved.

In operation 608, three-dimensional coordinates are generated from the phonetic representations from operation 606 using a generative network. The three-dimensional coordinates can be generated by generative network 112. The generative network can be a conditional generative adversarial network (CGAN) or another artificial intelligence network. The generative network can be a manually trained network. In other embodiments, the coordinates can be two-dimensional coordinates or another encoding as would be appreciated by a person of ordinary skill in the art.

The generative network can receive the phonetic representations from operation 606 to generate three-dimensional coordinates for each individual phonetic representations. For example, the coordinates can include $(x_1, y_1, z_1)$ coordinates corresponding to the phonetic representation of (a) "Hello". And a second set of coordinates can include $(x_2, y_2, z_2)$ coordinates corresponding to the phonetic representation of (c') "me".

In operation 610, an avatar is rendered that moves between the three-dimensional coordinates from operation 608. The avatar can be rendered by renderer 116. The avatar can be rendered using inverse kinematics. The avatar can be rendered based on the phonetic representations, and then animated between the phonetic representations using the three-dimensional coordinates from operation 608 to produce a natural (e.g., smooth, lifelike) animation of the sign language translation. Alternatively, a lifelike (e.g., deepfake) video can be rendered using a CGAN. This General Adversarial Network is similar to generative network 112 but is configured to be conditioned on coordinates (rather than phonetics) and produce videos (rather than coordinates).

Another aspect can be directed to detecting a sign language input and translating the sign language into an output language. Devices, systems, and methods capable of this aspect can be that described in U.S. patent application Ser. No. 17/302,699 (published as U.S. Patent App. Pub. No. 2022/0327961), which is incorporated by reference herein in its entirety.

Figure 7A:
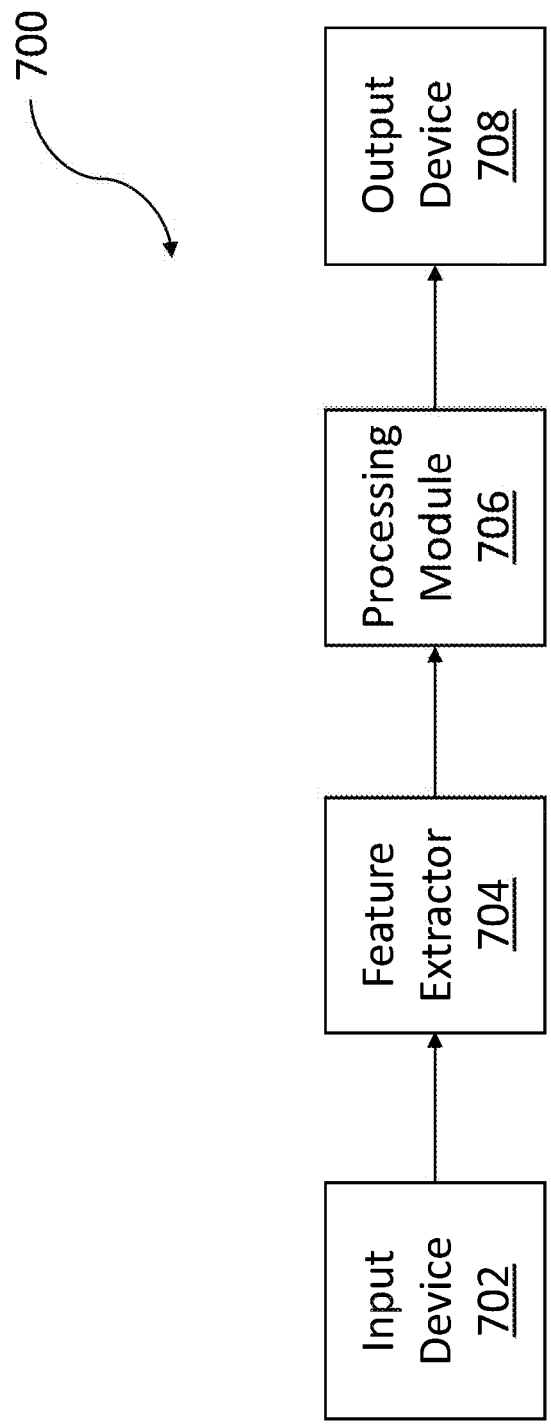
FIGS. 7A and 7B are block diagrams of an example system for detecting and translating a sign language input to an output language, according to some aspects of the present disclosure.

FIG. 7A is a block diagram of an example system 700 for detecting and translating a sign language input to an output language. System 700 can include an input device 702, a feature extractor 704, a processing module 706, and an output device 708.

In an aspect, a user can present sign language to input device 702. Input device 702 can be a camera configured to capture an image of the sign language input presentation. Input device 702 can be a single lens camera or a multi-lens camera. Input device 702 can be a camera that is part of a smartphone or another camera-enabled device. An image or sequence of images can be captured by input device 702 and can be streamed to other components of system 700 for further processing.

Either in real time or after the user presents sign language, the sign language input information is sent to feature extractor 704. Feature extractor 704 extracts out features (e.g., body pose keypoints, hand keypoints, hand pose, thresholded image, etc.). In example system 700, feature extractor 704 can include Convolutional Pose Machine and Region Based Convolutional Neural Networks to detect poses and to localize hands. The results from the Convolutional Pose Machine and Region Based Convolutional Neural Networks can be combined to compute a bounding box of dominant and non-dominant hands. This can be computed by iterating all bounding boxes, finding the ones closest to each wrist joint of the user's hands. Hand poses can then be extracted, and all information can be merged into flattened feature vectors. These feature vectors can be normalized by feature extractor 704 by a) setting the head coordinates to be (0,0) in the pose and both shoulders to be an average of one unit away via an affine transform; and b) setting the mean coordinates of each hand to be (0, 0, 0) and the standard deviation in each dimension for the coordinates of each hand to be an average of 1 unit via an affine transformation. These feature vectors can also be collected and smoothed using exponential smoothing.

Features from feature extractor 704 are then transmitted to processing module 706. Processing module 706 extracts sign language information from a sequence of the features. Processing module 706 can split the features into individual signs using a 1-Dimensional Convolutional Neural Network (CNN). The 1-D CNN can highlight the sign transition periods and can locate non-signing regions by outputting a special flag value (e.g., 0 is an intrasign region, 1 is an intersign region, and 2 is a nonsigning region). Once the individual signs are indicated, processing module 706 can determine if an entire signing region is contained within a list of pre-recorded sentences in a database of sentences. This search can be conducted using K Nearest-Neighbors (KNN) analysis with a Dynamic Time Warping (DTW) distance metric. If a signing region does not correspond to a sentence, processing module 706 can then go through each individual sign and determine if it was fingerspelled. If an individual sign is determined to have been fingerspelled, the sign can be processed using a seq2seq encoder-decoder framework on a Recurrent Neural Network (RNN). If an individual sign is determined to not have been fingerspelled, the sign can be determined by comparison with a database of individual signs. This comparison involves choosing the most likely match, such as through KNN with a DTW distance metric. In either case, a string of sign language gloss can be an output. This output is not yet in a target language, such as English, so processing module 706 can then translate the sign language gloss to the target language using a seq2seq RNN.

The sign language information from processing module 706 can then be displayed on an output device 708. This sign language information can include a target language translation of the original sign language input.

Figure 7B:
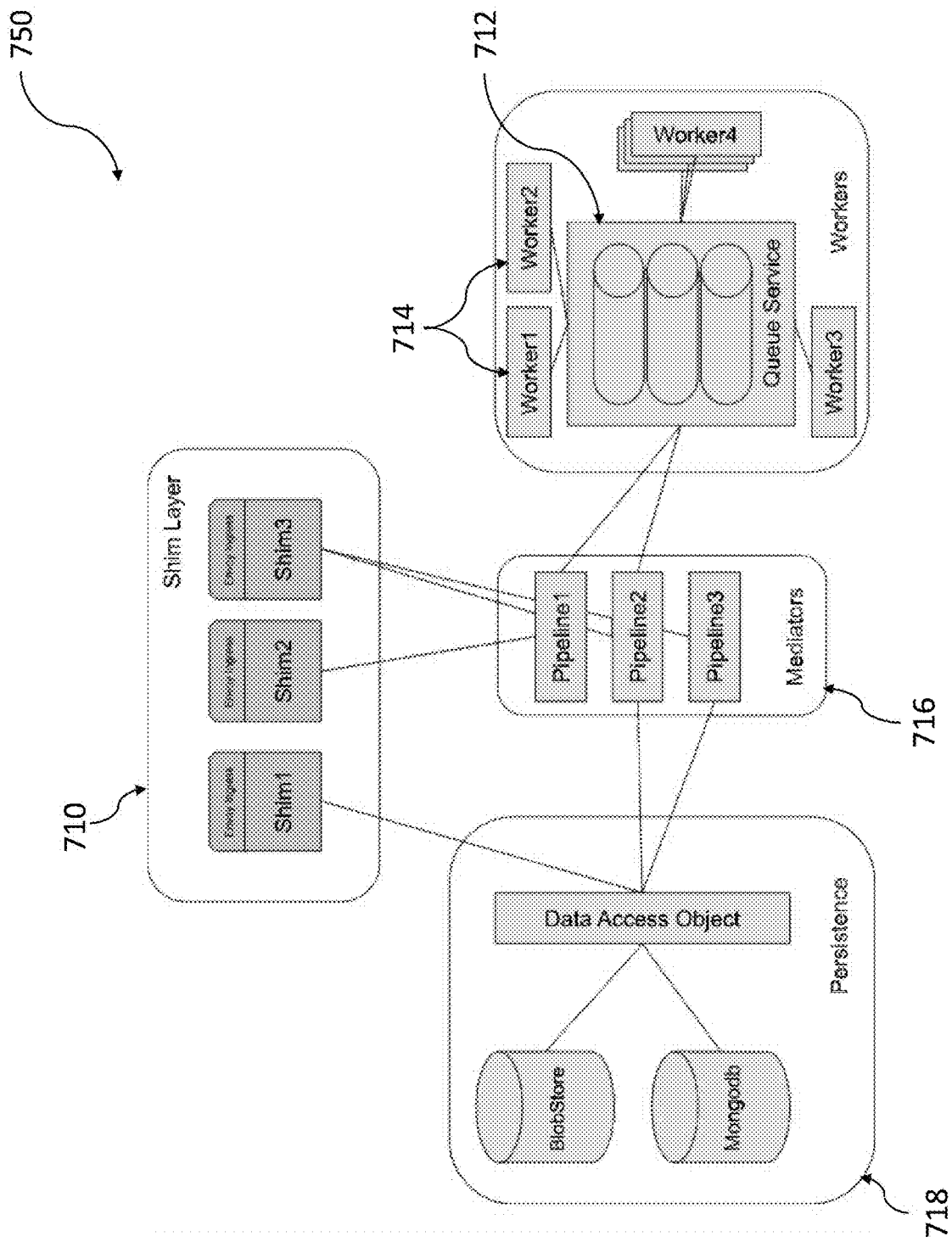

FIG. 7B is a block diagram of a data processing architecture 750 for a system (e.g., system 700) for detecting and translating a sign language input to an output language. Data processing architecture 750 is used for processing data through a translation system, such as system 700. Data processing architecture 750 is configured to provide data processing in realtime. However, data processing architecture 750 can also be configured to support offline or streaming data processing. Data processing architecture 750 can include ingress points (e.g., Envoy ingress points) or shims 710, queue service 712, workers 714, mediators 716, and a persistence layer 718. Data processing architecture 750 can be configured so that mediators 716 and workers 714 function together in an event-driven design, such that mediators 716 are modeled as a batch-sequential processor.

When mediators 716 are configured as a batch-sequential processor, data processing pipelines within data processing architecture 750 can occur in stages. These stages accept input data and output result data. The data occurs in sagas, which are composed of epochs, such that each saga can contains one or more epochs. Execution of a data pipeline saga is independent of execution of other sagas. These pipelines involve two types of stages: gated stages and streaming stages. Gated stages have two phases: processing and accumulation. During the processing phase of a gated stage, epochs are processed independently of other epochs. Then, after all epochs for a saga have been ingested, the results of the processing stage are accumulated. This produces one or more packets of data. Effectively, the gated stages accumulate data and wait for a certain criterion before outputting additional data. Streaming stages process each data packet independently of each other and output processed packets as soon as the result is available.

As stages become more computationally intense, data processing architecture 750 takes advantage of workers 714. Workers 714 can process a stage. Workers 714 can be hosted on a separate computing device from mediators 716, such that the number of workers 714 can be scaled based on the amount of data traffic. A pseudo-synchronous protocol can be used when interacting with workers 714 for data processing. This protocol will only trigger workers 714 for processing when they have available computing capacity. In this way, queue service 712 can be used to orchestrate processing.

Queue service 712 can be a centralized queue system. Queue service 712 can be configured with dynamic prioritization, utilizing batch and realtime classifications. In one aspect, the dynamic prioritization can be configured as full prioritization. In this aspect, batch data is fully processed only after realtime data is fully processed. In another aspect, the dynamic prioritization can be configured as probabilistic prioritization. In this aspect, the batch and realtime classifications are used to treat the queue as having two separate queues—one for batch data and one for realtime data. When the overall queue is dequeued, it can be probabilistically selected which queue to dequeue from.

Persistence layer 718 holds data. Persistence layer 718 can hold small document data and large object data. Persistence layer 718 can include various databases (e.g., Mongodb, BlobStore, etc.) for storing the data. Persistence layer 718 can include a data access layer for controlling access to the various databases.

Shims 710 relay external traffic to the internal system (e.g., system 700). Each of shims 710 can have a relay and a processor. The processor can connect to the internal system. The processors can expose a gRPC service. As gRPC is HTTP2 based, and most of the web relies on HTTP1, the relays can convert HTTP2 to HTTP1. This relay can either be automatically provided by envoy, or can be manually written Shims 710 can also be configured to provide authentication mechanisms for external traffic.

When described with reference to system 700, data processing architecture 750 involves a multi-stage machine learning pipeline to detect a sign language presentation from imagery or video and to translate this sign language input into a target language. When examining the processing of system 700, the gated stages and streaming stages can occur over multiple processes.

Initially, a streaming stage takes in an image (e.g., from input device 702) of the sign language presentation and outputs pose information. In some aspects, MediaPipe can be used to perform this pose prediction.

Then, a gated stage takes the pose data and forms a feature queue (e.g., using feature extractor 704). Each pose vector of the pose data from the prior streaming stage can include various fields, such as one indicating face, fingers for each hand on screen, and keypoints on the body. Each of these fields can be normalized differently. The face and keypoints for hands can be normalized using a Z-score normalization, where each dimension is calculated independently. The body keypoints can be normalized by setting the head to the origin, and making the average distance between the head and each shoulder 1 unit.

A subsequent streaming stage can take in the feature queue and output a myopic prediction of what is being signed by the user at any given time (e.g., using processing module 706). An isolated sign classifier can be used with the myopic prediction. The isolated sign classifier is trained to classify sequences of signs using individual signs. Specifically, the sliding-window nature of convolutional layers can be exploited. A fully convolutional 1D CNN can take in a feature vector and output what sign was presented in the image. The CNN can then be used to produce time-wise predictions of what was signed. This myopic prediction of signs can then be smoothed to a series of signs by another streaming stage.

Finally, a streaming stage can take the series of signs and convert it to the target language (e.g., presented on output device 708). To translate a string of signs into the target language, a Large Language Model, such as GPT-3, can be used. Specifically, GPT-3 few-shot learning can be used and then GPT-3 can predict the output. The final three streaming stages can be handled using an unconstrained model, such as using live interpreter data for training data of the machine learning pipeline.

Figure 8:
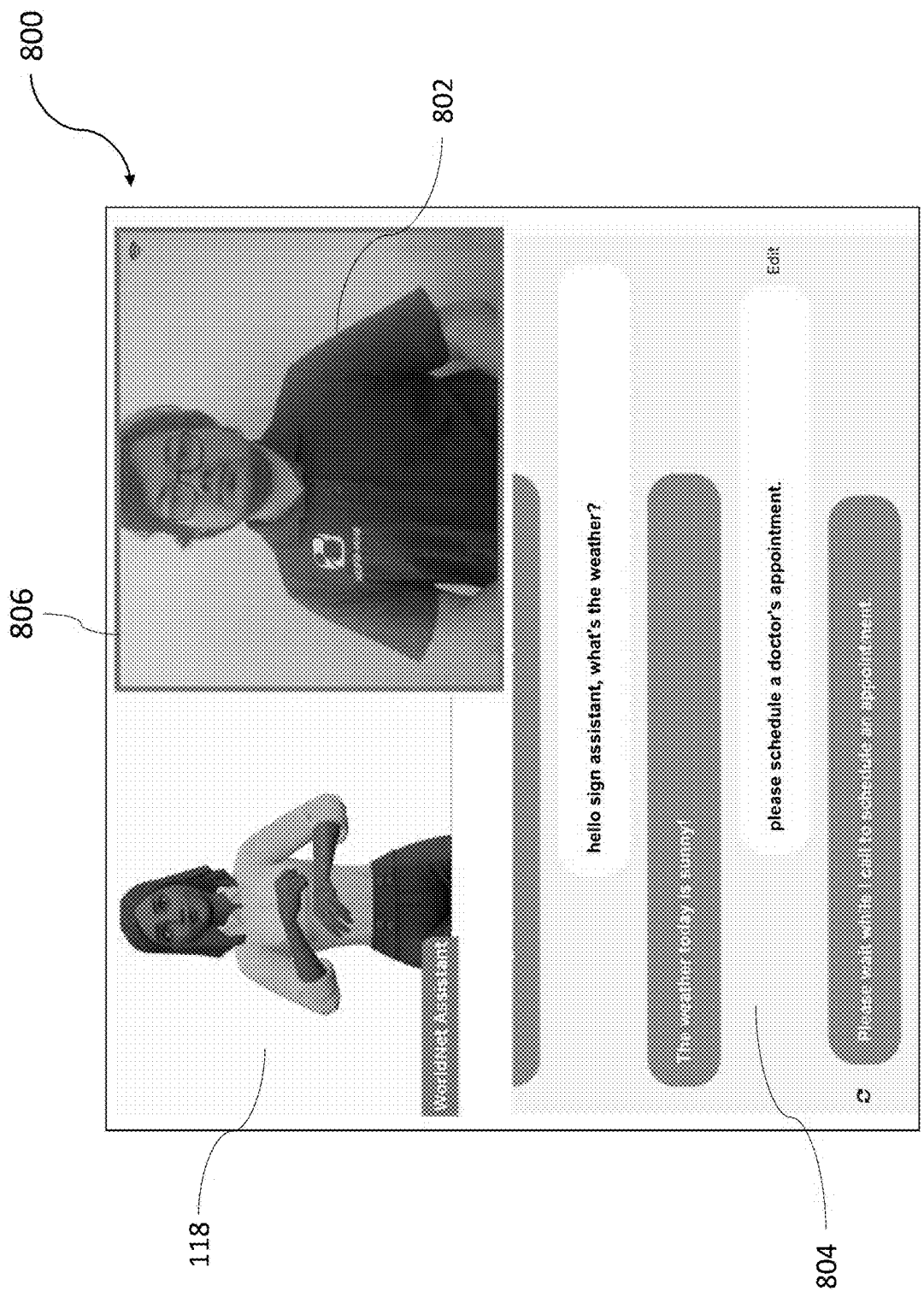
FIG. 8 is an illustration of a user interface of a bidirectional communication system allowing for realtime communication between a signing entity and a non-signing entity, according to some aspects of the present disclosure.

FIG. 8 is an illustration of a user interface 800 of a bidirectional communication system allowing for realtime communication between a signing entity and a non-signing entity, according to some aspects of the present disclosure. User interface 800 can include avatar 118, a video feed of signing user 802, a chat screen 804, and a highlighted border 806.

The devices, systems, and methods described above with reference to FIGS. 1-6 can be combined with devices, systems, and methods described above with reference to FIGS. 7A-7B.

This combination results in a bidirectional communication system allowing realtime communicate between a signing entity and a non-signing entity. For example, a signing person can sign into a camera (such as that described in FIGS. 7A-7B). The camera can interface with a computer system (such as that described in FIGS. 1-9) that can detect the person's sign language and can translate the person's sign language into an English output. The English output can be presented audibly or in writing to a non-signing person via a user interface (e.g., user interface 800). The non-signing person can then present, audibly or in writing, a response to the signing user through their user interface (e.g., user interface 800). Using the devices, systems, and methods described above with reference to FIGS. 1-6, this audio or written communication can then be translated into sign language grammar and presented as an avatar-presented sign language translation (e.g., avatar 118), presented to the signing person via their user interface (e.g., user interface 800). These translations can occur in both directions, from an input language (e.g., English) to a sign language (e.g., ASL) and/or from a sign language (e.g., ASL) to an output language (e.g., English).

In another example, the bidirectional communication system can be implemented with an active chat screen (e.g., chat screen 804), presenting the input languages and the output languages to both persons as the translation occurs. The active chat screen can allow for both persons to read written versions of the input and output languages and can allow for both persons to type written text to the other person via various devices (e.g., a keyboard). In yet another example, the first example can be implemented with a signing person and a non-signing chat bot. In this example, the chat bot can be an artificial intelligence or non-artificial intelligence system capable of detecting output language (e.g., English), searching for appropriate responses to the output language, and producing an input language (e.g., English) response for further translation into an avatar sign language presentation (e.g., avatar 118).

Although the bidirectional communication devices, systems, methods, and examples are described with reference to two users, bidirectional communication can occur between any two users among any plurality of users and can occur in any combination of the described examples. For example, in an aspect, the bidirectional communication devices, systems, and methods can be implemented into a teleconference system. The teleconference system can provide a meeting environment for many users to meet virtually. At least one of the users can be a signing user (e.g., signing user 802). To communicate with other participants in the meeting, signing user 802's teleconference system can incorporate that of the present disclosure. For instance, signing user 802 can present signs into their camera (such as that described in FIGS. 7A-7B), and an audio or written translation can be presented to all other participants in the meeting (e.g., via a chat screen). Additionally, when any of the other participants in the meeting are speaking or writing, an avatar (e.g., avatar 118) can appear in the signing user's user interface (e.g., user interface 800), presenting a sign language translation of the other participants' communications.

In aspects involving virtual communication between at least two users, whenever a signing user (e.g., signing user 802) begins to sign, the system can automatically detect this movement (e.g., using systems described in FIGS. 7A-7B) and can present highlighted border 806 around the video feed of the signing user in the user interfaces of the other participants (e.g., user interface 800). Highlighted border 806 can be provided when a movement threshold is exceeded. The movement threshold can be a scalar value that activates highlighted border 806 when exceeded. For example, a signing user's head can be detected and assigned coordinates of (0, 0) or a signing user's hands can be detected and assigned coordinates of (0, 0, 0). In this example, the movement threshold could be set to 1, such that if the signing user moves their head or hands 1 unit away from any of the assigned coordinates, highlighted border 806 is activated. This highlighted border 806 visually indicates to other participants that the signing user is communicating.

In aspects where a user's sign language presentation (e.g., signing user 802's signing) is detected and the sign language is translated into an output language as part of a bidirectional communication system, the output language can be presented to the signing user as a listing of most probable translations. The signing user can select one of the listing of translations for presentation to the non-signing entity (e.g., via chat screen 804) or can edit one of the listing of translations before presentation to the non-signing entity (e.g., via chat screen 804).

In aspects involving a chat bot, a module can exist in the combined system (e.g., a system described with reference to FIGS. 1-6 combined with a system described with reference to FIGS. 7A-7B) to handle processing between the combined system and an external chat bot. For example, a module (e.g., a computing system) can exist that receives the output language (e.g., English translation from sign language input from signing user 802 such as that produced in FIGS. 7A-7B) and send the output language to the external chat bot. After the external chat bot processes the output language and generates a response, the external chat bot can send an input language (e.g., an English response) to the module. The module can then forward the input language to the system described with reference to FIGS. 1-6, for processing into avatar 118. Alternatively, a chat bot can be located internal to the combined system as part of the module.

When capturing the video feed of signing user 802 for processing consistent with FIGS. 7A-7B, a single lens camera or a multi-lens camera can be used. When a multi-lens camera is used, the images captured by each lens can be processed independently to predict the sign language translation presented by signing user 802. A confidence can be assigned to the predicted sign language translation. The confidence can be a numerical value between 0 and 1, which represents the probability that the prediction outputted by a model is correct. The predictions and confidences of each camera lens can be averaged to generate a more accurate output language translation.

Calibration and user customization of a bidirectional communication system are not required for effective real-time translation. However, in some aspects, a profile can be created allowing for user customization of processing. The profile can include information, such as the location (e.g., national region) of signing user 802 or the dominant handedness of signing user 802. Both the location and dominant handedness can be useful in accurately predicting signs presented by the signing user. This profile information can be accessed through a machine-readable code (e.g., QR code) unique to signing user 802. Without user specific information, the system can be configured to make predictions. For example, dominant handedness of signing user 802 can be predicted through tracking of which hand is moving more.

Figure 9:
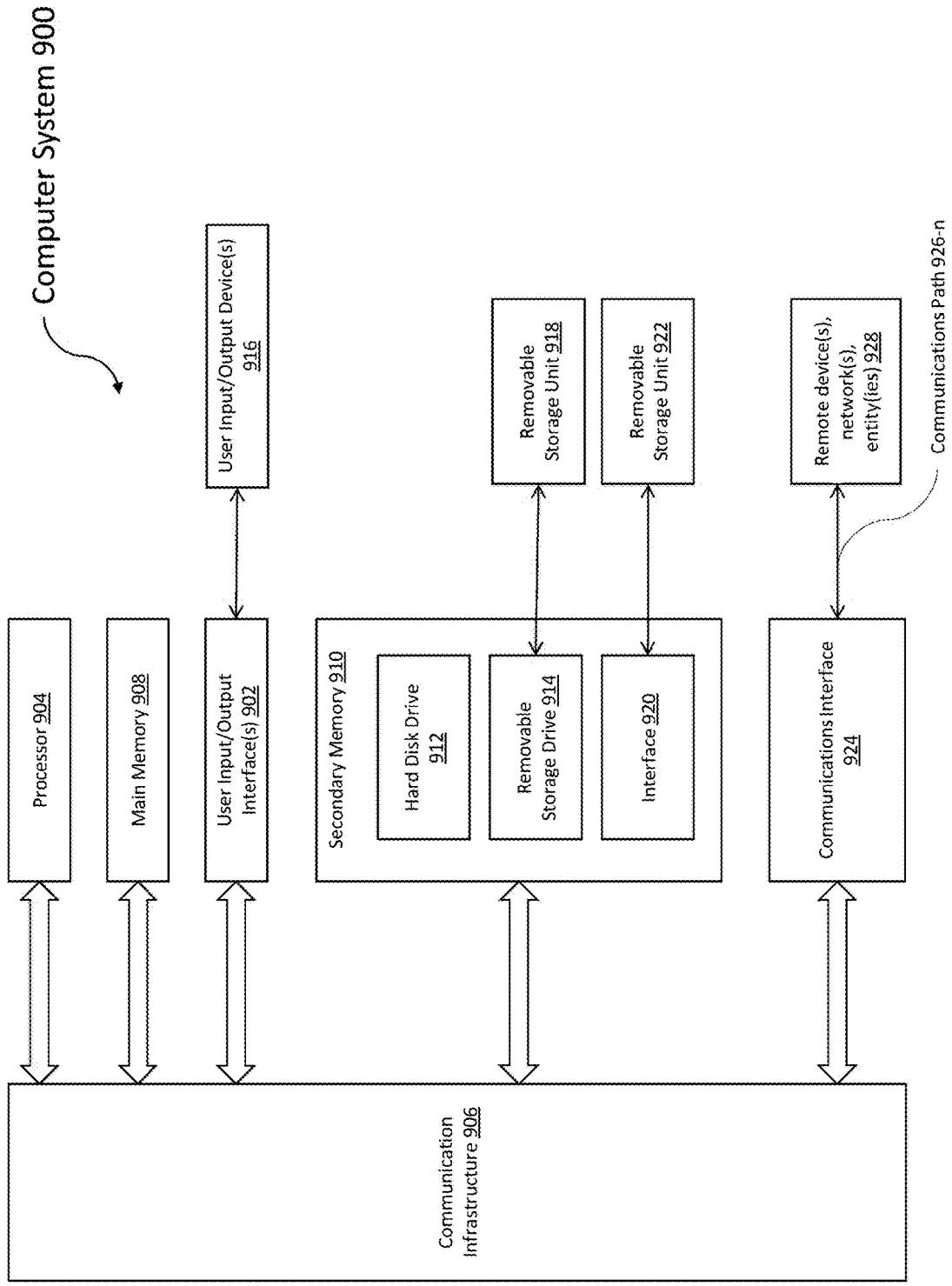
FIG. 9 is a block diagram of an example computer system useful for implementing various aspects.

Various aspects can be implemented, for example, using one or more computer systems, such as computer system 900 shown in FIG. 9. Computer system 900 can be used, for example, to implement a system for presenting a sign language translation of an input language. For example, computer system 900 can retrieve phonetic representations corresponding to sign language grammar, can generate three-dimensional coordinates from the phonetic representations, and can render an avatar that moves between the three-dimensional coordinates. Computer system 900 can be used to perform the operations of method 600 of FIG. 6. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 can each be a graphics processing unit (GPU). In an aspect, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 900 also includes user input/output device(s) 916, such as monitors, keyboards, pointing devices, etc., that communicate with communication infrastructure 906 through user input/output interface(s) 902.

Computer system 900 also includes a main or primary memory 908, such as random access memory (RAM). Main memory 908 can include one or more levels of cache. Main memory 908 has stored therein control logic (e.g., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 includes a computer usable or readable storage device having stored thereon computer software (e.g., control logic) and/or data. Removable storage unit 918 can be a floppy disk, magnetic tape, compact disk, DVD, optical storage disk, and/any other computer data storage device. Removable storage drive 914 reads from and/or writes to removable storage unit 918 in a well-known manner.

According to an exemplary aspect, secondary memory 910 can include other means, instrumentalities or other approaches for allowing computer programs and/or other instructions and/or data to be accessed by computer system 900. Such means, instrumentalities or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 can further include a communication or network interface 924. Communication interface 924 enables computer system 900 to communicate and interact with any combination of remote devices, remote networks, remote entities, etc. (individually and collectively referenced by reference number 928). For example, communication interface 924 can allow computer system 900 to communicate with remote devices 928 over communications path 926, which can be wired and/or wireless, and which can include any combination of LANs, WANs, the Internet, and any other suitable communication means. Control logic and/or data can be transmitted to and from computer system 900 via communication path 926.

In an aspect, a tangible, non-transitory apparatus or article of manufacture comprising a tangible, non-transitory computer useable or readable medium having control logic (e.g., software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (e.g., computer system 900), causes such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 9. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A method, comprising:
receiving input language data;
tokenizing the input language data;
translating the tokenized input language data to sign language grammar resulting in sign language gloss;
generating artificial coordinates from the sign language gloss using a generative network, wherein the generative network is configured to output the artificial coordinates; and
rendering an avatar or video that moves between the artificial coordinates.

2. The method of claim 1, wherein translating the tokenized input language data to the sign language grammar comprises:
tokenizing the input language data into individual words;
removing punctuation, determiners, or predetermined vocabulary from the individual words to form a resulting string;
reducing the resulting string according to a lemmatization scheme to form a lemmatized string; and
performing a transduction on the lemmatized string to produce sign language grammar.

3. The method of claim 2, wherein performing the transduction comprises performing a tree transduction using synchronous grammar models configured to parse the lemmatized string using parsing algorithms.

4. The method of claim 1, wherein generating the artificial coordinates comprises training the generative network to generate the artificialcoordinates based on other artificial coordinates.

5. The method of claim 1, wherein the phonetic representations corresponding to sign language grammar are digital representations of individual signs created through manual input of body configuration information corresponding to the individual signs.

6. The method of claim 5, wherein the body configuration information comprises at least one of hand symmetry, handshape, palm band orientation, finger vectors, hand position source, hand position destination, global motion of a hand, local motion of the hand, or mouth morpheme.

7. A system, comprising:
a processor, and
a memory, wherein the memory contains instructions stored thereon that when executed by the processor cause the processor to:
receive input language data;
translate the input language data to sign language grammar by reducing the input language data according to a lemmatization scheme;
retrieve phonetic representations that correspond to the sign language grammar, wherein the phonetic representations are digital representations of individual signs created through manual input of body configuration information corresponding to the individual signs;
generate coordinates from the phonetic representations using a generative network; and
render an avatar or video that moves between the coordinates.

8. The system of claim 7, wherein to translate the input language data to sign language grammar, the processor:
tokenizes the input language data into individual words;
removes punctuation, determiners, or predetermined vocabulary from the individual words to form a resulting string; and
performs a transduction on the resulting string to produce the sign language grammar.

9. The system of claim 8, wherein to perform the transduction, the processor performs a tree transduction using synchronous grammar models configured to parse a lemmatized string using parsing algorithms.

10. The system of claim 7, wherein to generate the coordinates, the processor trains the generative network to generate the coordinates based on artificial coordinates.

11. The system of claim 10, wherein to train the generative network, the processor determines an accuracy of the artificial coordinates using a discriminator to measure coordinates detected through pose recognition.

12. The system of claim 7, wherein the body configuration information comprises at least one of hand symmetry, handshape, palm hand orientation, finger vectors, hand position source, hand position destination, global motion of a hand, local motion of the hand, or mouth morpheme.

13. A system, comprising:
a camera configured to capture an image; and
a computing device coupled to the camera, the computing device comprising:
a display;
a processor; and
a memory, wherein the memory contains instructions stored thereon that when executed by the processor, cause the processor to:

translate sign language in the image to a target language output, comprising:
  capturing the image;
  detecting pose information from the image;
  converting the pose information into a feature vector;
  converting the feature vector into a sign language string; and
  translating the sign language string into the target language output; and
present a sign language translation of a target language input on the display, comprising:
  receiving the target language input;
  translating the target language input to sign language grammar by:
    tokenizing the target language input into individual words;
    removing punctuation, determiners, or predetermined vocabulary from the individual words to form a resulting string;
    reducing the resulting string according to a lemmatization scheme to form a lemmatized string; and
    performing a transduction on the lemmatized string to produce the sign language grammar;
  retrieving phonetic representations that correspond to the sign language grammar;
  generating coordinates from the phonetic representations using a generative network;
  rendering an avatar or video that moves between the coordinates; and
  presenting the avatar or video on the display.

14. The system of claim 13, wherein the transduction is based on synchronous grammar models configured to parse the lemmatized string using parsing algorithms.

15. The system of claim 13, wherein the generative network is configured to be trained to generate the coordinates based on artificial coordinates.

16. The system of claim 15, further comprising a discriminator configured to measure coordinates detected through pose recognition to determine the accuracy of the artificial coordinates.

17. The system of claim 13, wherein the phonetic representations are digital representations of individual signs created through a manual input of body configuration information corresponding to the individual signs, and wherein the body configuration information comprises at least one of hand symmetry, handshape, palm hand orientation, finger vectors, hand position source, hand position destination, global motion of a hand, local motion of the hand, or mouth morpheme.

18. The system of claim 13, wherein to convert the feature vector, the processor applies a Convolutional Neural Network configured to output one or more flag values associated with an intrasign region, an intersign region, or a non-signing region, and wherein the one or more flag values correspond to an individual sign.

19. The system of claim 13, wherein to convert the feature vector, the processor:
  splits the feature vector into individual regions; and
  processes the individual regions into the sign language string.

20. A method, comprising:
  receiving input language data;
  tokenizing the input language data;
  generating coordinates from the tokenized input language data, wherein the generated coordinates correspond to sign language;
  creating one or more pose-images of the generated coordinates;
  generating a representative image of a person based on a pose-image from the one or more pose-images using an image generation network; and
  generating a video from the representative image.

21. The method of claim 20, wherein the coordinates are generated using a pose generation network.

22. A system, comprising:
  a camera configured to capture at least one of an image or a video;
  an audio capture device configured to capture audio; and
  a computing device in communication with the camera, the computing device comprising:
    a display;
    a processor; and
    a memory, wherein the memory contains instructions stored thereon that when executed by the processor, cause the processor to:
      detect pose information of a user depicted in the image or the video;
      convert the pose information into target language tokens;
      decode the target language tokens into a target language output; and
      detect, based on the audio captured by the audio capture device and via voice activation detection, that the user is speaking;
        based on the detection that the user is speaking, present a sign language translation of a target language input on the display by:
          converting speech in the captured audio into text;
          tokenizing the text into one or more tokens;
          generating coordinates from the one or more tokens;
          generating a series of pose-images from the coordinates;
          generating a series of photorealistic images by using a generative network, wherein the series of photorealistic images corresponds to the series of pose-images;
          rendering the series of photorealistic images into a video; and
          presenting an avatar within the video on the display.

23. The system of claim 22, wherein the coordinates are generated using the generative network.

24. A method, comprising:
  detecting pose information of a user depicted in an image captured by a camera or a video captured by the camera;
  converting the pose information into target language tokens;
  decoding the target language tokens into a target language output;
  detecting, based on audio captured by an audio capture device and via voice activation detection, that the user is speaking; and
  based on the detection that the user is speaking, presenting sign language translation of a target language input on a display by:
    converting speech in the captured audio into text;
    tokenizing the text into one or more tokens;

generating coordinates from the one or more tokens;
generating a series of pose-images from the coordinates;
generating a series of photorealistic images by using a generative network, wherein the series of photorealistic images corresponds to the series of pose-images;
rendering the series of photorealistic images into a video; and
presenting an avatar within the video on the display.

25. The method of claim 24, wherein the coordinates are generated using the generative network.

* * * * *